Oct. 11, 1949.  W. B. BYERS  2,484,686
MACHINE FOR MAKING INSULATING BLANKETS
Filed Sept. 3, 1946  4 Sheets-Sheet 1

Fig. 1.

INVENTOR.
WILLIAM B. BYERS
BY Alfred R. Fuchs
ATTORNEY

Fig. 2.

Oct. 11, 1949. W. B. BYERS 2,484,686
MACHINE FOR MAKING INSULATING BLANKETS
Filed Sept. 3, 1946 4 Sheets-Sheet 3

INVENTOR.
WILLIAM B. BYERS
BY Alfred R. Fuchs
ATTORNEY

Oct. 11, 1949.                    W. B. BYERS                    2,484,686
                        MACHINE FOR MAKING INSULATING BLANKETS
Filed Sept. 3, 1946                                         4 Sheets-Sheet 4

INVENTOR.
WILLIAM B. BYERS
BY
Alfred R. Fuchs
ATTORNEY

Patented Oct. 11, 1949

2,484,686

UNITED STATES PATENT OFFICE 2,484,686

MACHINE FOR MAKING INSULATING BLANKETS

William B. Byers, Kansas City, Mo.; Willameta B. McDowell administratrix of said William B. Byers, deceased Application September 3, 1946, Serial No. 694,545

17 Claims. (Cl. 154—27)

My invention relates to a machine for making insulating blankets, and more particularly to a machine for making an insulating blanket of the general character of that shown in my Patent No. 2,342,839, patented February 29, 1944. This is a continuation in part of my application Serial No. 477,609, filed March 1, 1943, now Patent No. 2,406,801, patented September 3, 1946.

My machine comprises means for making an insulating blanket that contains parcels of fibrous insulating material in a loose fluffy condition, which may be made of wood fiber or waste paper, or similar material, treated in a manner to form a fibrous cottony material therefrom. In the blanket made by my improved machine, the parcels of such fluffy fibrous material are arranged in staggered overlapping relation lengthwise of the blanket, and said blanket comprises a pair of outer plies and an inner ply, which is formed into pockets for receiving the parcels of insulating material above referred to. My invention particularly relates to means for forming said pockets and depositing the loose fluffy insulating material therein, in a loose fluffy condition, in combination with means for corrugating and measuring the central ply or web of sheet material that provides the pocket forming means, so that exactly the proper length of said material is fed into the means for providing the parcels of insulating material and depositing the same in said pockets.

The above referred to means, preferably, comprises a pair of rotating wheels or drums that are provided with a plurality of receptacles on their periphery, which are uniformly spaced and are of a uniform size and are adapted to receive and measure out parcels of the insulating material to be laid in place in forming the blanket, the projecting receptacles on one of said wheels being spaced to provide spaces to receive the similarly projecting receptacles on the other of said drums or wheels to cause said drum-like or wheel-like members to intermesh in the manner of a pair of members having gear teeth. However, my invention includes means for driving said rotatable drum-like or wheel-like members at the same rate of rotation, which means is independent of said receptacles so as to exert no driving forces on said receptacles.

My improved machine further comprises means for feeding a web of fibrous sheet material, such as paper, between the intermeshing projections so that oppositely facing troughs or pockets are formed in said web of sheet material, into which the loose fluffy fibrous insulating material is deposited in small loose pre-shaped parcels from the receptacles first on one side of said web of sheet material and then on the other side thereof.

It is a further purpose of my invention to provide a pair of rotatable drum-like or wheel-like members of the above mentioned character, comprising an upper and a lower such a rotatable member, with the upper of said rotatable members having the spaces between the projecting insulation molding receptacles or troughs of substantially the same depth as the projection of the insulation receiving receptacles on the lower of said rotatable members; but with the depth of the spaces between said receptacles or troughs on the lower of said rotatable members about twice as great as those on the upper rotatable member to provide sufficient space for said web to be depressed in said spaces, and have deposited thereon the contents of the troughs of the upper rotatable member.

My invention further comprises means for bringing a second web of paper or similar sheet material in contact with the first web or sheet where said first web or sheet rests on the tops of the receptacles of the lower wheel-like or drum-like member to thereby fix and confine the insulation deposited in said pockets or troughs on said first mentioned web of sheet material and confine the same in transversely elongated pockets formed between the two sheets.

My invention further comprises means for depositing the loose fluffy fibrous insulating material in the receptacles or troughs of the lower wheel-like or drum-like members on the first mentioned web of sheet material between the parcels previously deposited thereon by the upper rotatable drum-like or wheel-like member on the opposite side of the sheet therefrom, this being accomplished by passing the two webs that have been secured together around the lower portion of said drum-like or wheel-like member, with the first mentioned web of sheet material passing across the tops of the receptacles for molding said loose fibrous material into parcels of proper size and shape, which causes said parcels of loose fibrous insulating material to be deposited by gravity from said receptacles or troughs into the pockets formed on the side of said first mentioned web that is next to the lower of said rotatable drum-like or wheel-like members, by inversion thereof when the lower portion of said lower rotatable member is reached.

My invention further comprises means for applying a third web of sheet-like material having an adhesive on the lower side thereof in position over the first mentioned sheet, to confine said material in the pockets thus formed between said third mentioned web and said first mentioned web and subsequently folding the second and third webs, which are the outer plies of the blanket to be produced, on each other to form flaps, which may be used for securing the blanket in place where it is to be used, the parcels of fibrous insulating material not extending to the portion of said webs that are thus folded to form said flaps.

It is a further important purpose of my invention to provide means for making the central ply formed from the first mentioned web of sheet material so that it is capable of a small amount of elongation and contraction so as to provide greater flexibility for the blanket, my machine including means for corrugating said first mentioned web prior to passing the same into the intermeshing portions of said aforementioned rotatable members, by passing the same between crinkling rolls, which also serve the important purpose of measuring the length of the sheet material that is being fed between the intermeshing receptacle carrying rotatable members that apply the parcels of insulation thereto, and accordingly are driven at a speed that has a definite ratio to the speed of the insulation parcel supplying rotatable wheel-like or drum-like members.

Another important purpose of my invention is to provide means for supplying the receptacles with the loose fluffy insulating material in such a manner as to retain the same in loose fluffy condition after having been supplied to said receptacles, said means comprising feed hoppers in which the loose fluffy insulating material is kept in an agitated condition to maintain the same in a fluffy condition, that apply the loose fluffy insulating material to the surface of the drum-like or wheel-like members both at the portions thereof that have the receptacles or molds provided thereon and the spaces therebetween, and thereafter removing the loose fluffy insulating material from the spaces between the receptacles by an air blast and a suction device cooperating to clean the spaces between the receptacles without disturbing the material in said receptacles and without compressing the material in said receptacles.

It is another important purpose of my invention to provide means for controlling the bending of the cover plies of the insulating blanket, comprising means for providing breaks or scores in the paper or similar web of sheet material running transversely of said web in closely spaced relation longitudinally of said web parallel to each other, so that upon rolling, shipping, or handling the blanket it will tend to bend, fold or crease along said lines flexing along said lines or creases instead of wrinkling in all directions, as would otherwise be the case. In my improved machine the means for accomplishing this purpose comprises means for passing a cover ply, or the cover plies, through serrated rolls, which provide the creases, scores or indentations therein above referred to.

My machine further comprises means for applying a plurality of coatings, including a coating of wax and an asphaltic coating, to a plurality of plies of the insulating blanket, including striping means and means for heating the coating materials by means of a liquid heating medium that is adapted to heat all of the containers for the coating materials to the same temperature.

It is a further purpose of my invention to provide means for applying said coating materials to the above referred webs or plies of material in such a manner that the desired thickness of said coating is applied thereto, including means for preventing an excess thereof adhering to said webs of material, my improved machine comprising applying means that apply the various coating materials by means of a wiping action to said webs, and said applying means are provided with scraping means for removing excessive amounts of the coating materials from said webs.

Other objects and advantages of my invention will appear as the description of the drawings proceeds. I desire to have it understood, however, that I do not intend to limit myself to the particular details shown or described, except as defined in the claims.

Referring in detail to the drawings, my improved machine for making insulating blankets comprises means for rotatably mounting a roll 20 of fibrous sheet material, such as kraft paper, from which a web 21 of said sheet material extends over suitable guide rollers, such as the guide rollers 22 and 23, to a pair of corrugating or crimping rollers 24 and 25, producing the corrugated or crimped ply 21' after passing through said rollers. A rotatable drum-like or wheel-like member 26 is provided, which is mounted to rotate about a fixed axis, the same being mounted on a shaft 27 mounted in suitable bearings on the framework of the machine indicated generally by the numeral 28. Said member 26 may be referred to as the upper drum-like or wheel-like member, and a similar drum-like or wheel-like member 29 is provided, which is similarly mounted on a shaft 30 on said framework and which may be referred to as the lower drum-like or wheel-like member. It will be noted that the axis of rotation of the member 29 is below and vertically out of alignment with the axis of the drum 26 and the drums are so spaced that the same will have their peripheries in juxtaposition at a point slightly above the bottommost point of the periphery of the drum 26 and slightly below the topmost point of the periphery of the drum 29.

Figure 1:
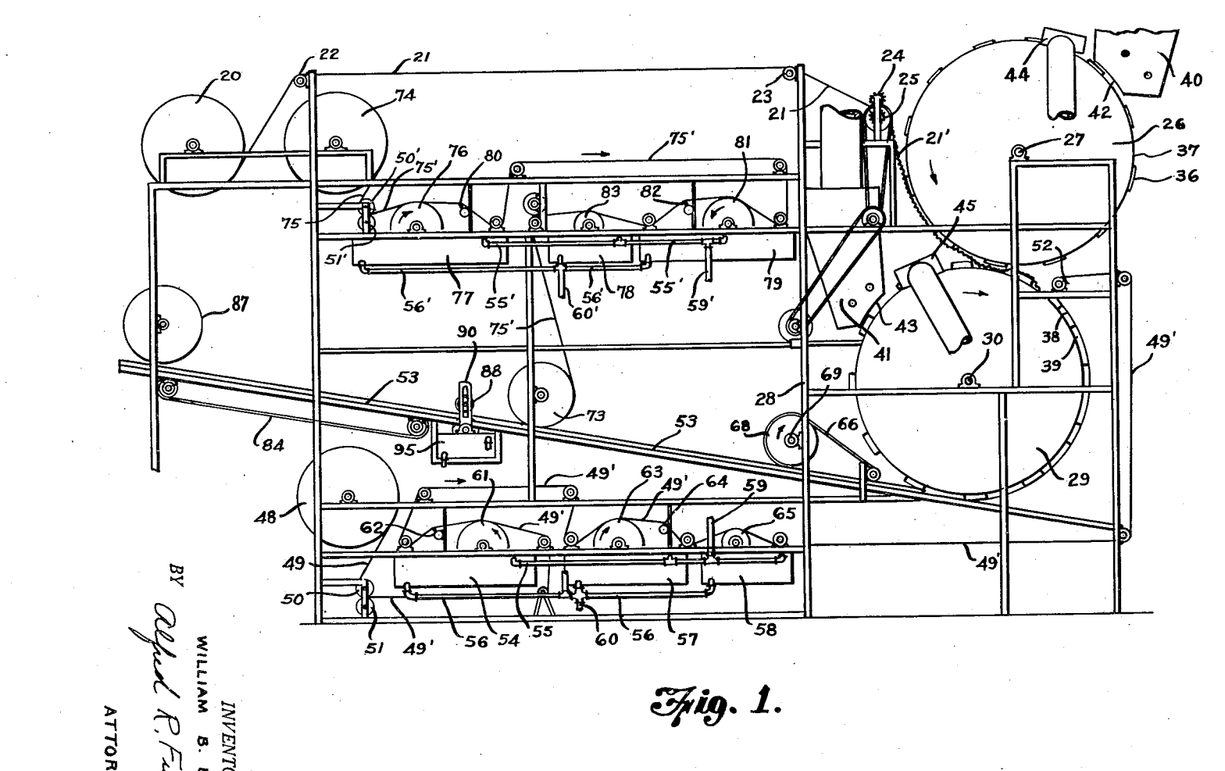
Fig. 1 is a view in side elevation of my improved machine for making insulating blankets.
Figure 2:
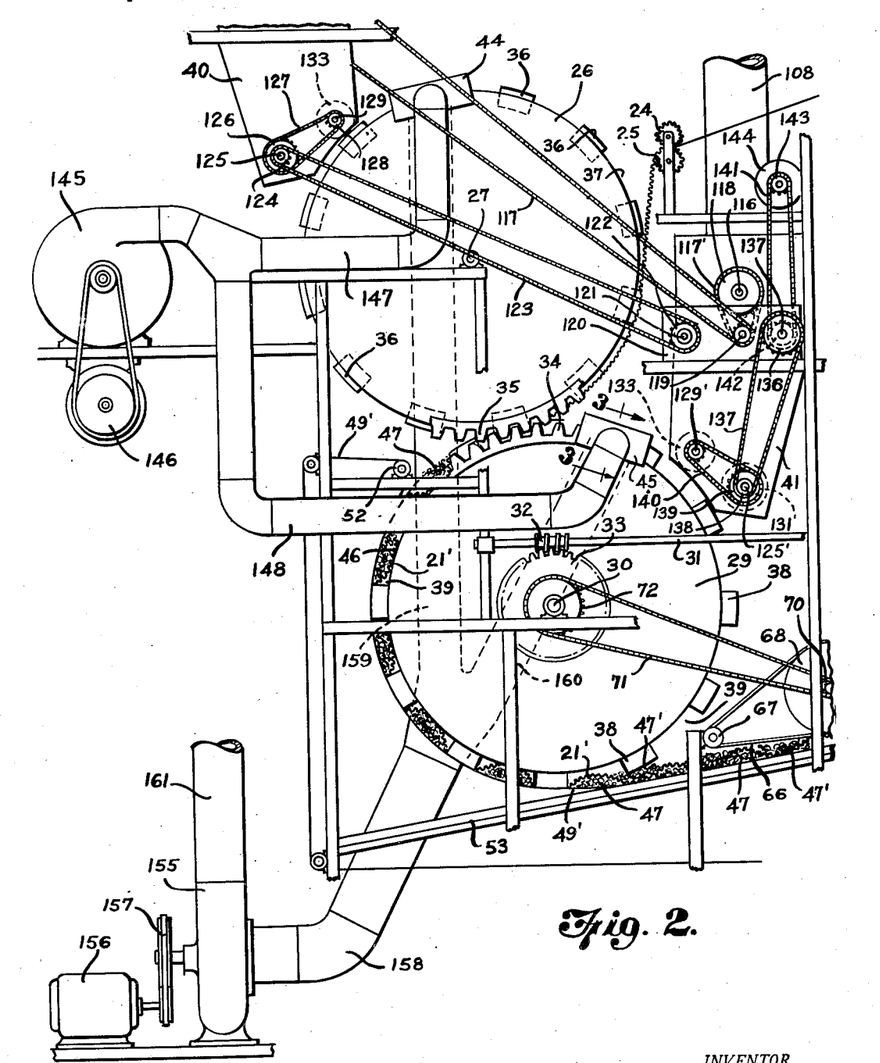
Fig. 2 is an enlarged view in elevation, partly broken away, of the means for corrugating the central ply or web of said blanket and the means for applying the loose fluffy insulating material thereto, as viewed from the opposite side of the machine from that shown in Fig. 1 and on a somewhat larger scale.

The corrugated or crimped ply 21' is passed between the peripheries of said drums 26 and 29 in the manner shown in Fig. 1 of the drawings, and partly around the peripheries of both of said drums, said corrugated ply thus overlying or engaging the periphery of the drum 26 on the downwardly traveling side thereof from a point slightly below the axis of rotation of said drum to the point at which the periphery of said drum is in juxtaposition to the periphery of the lower drum 29. The drums 26 and 29 travel in the direction of the arrows, as indicated in Figs. 1 and 2.

A drive shaft 31 is provided for driving the various parts of said machine that must be driven in synchronism with each other, that is, the various parts to be described below that must travel at predetermined relative speeds to obtain the desired operation of the machine, are driven from the drive shaft 31, which is driven by any suitable prime mover such as an electric motor. The shaft 31 is provided with a worm 32 thereon that meshes with the worm wheel 33 fixed on the shaft 30 to rotate the drum 29 in the direction indicated by the arrows in Figs. 1 and 2. Provided on the one side wall of the drum 29 adjacent the periphery of said drum is a ring gear 34, the same being fixed to said drum and meshing with a similar ring gear 35 provided on the corresponding side wall of the drum 26 to drive said drum 26 at the same peripheral speed as the drum 29.

Mounted to project from the periphery of the drum 26 at regular spaced intervals are receptacles or forms of a pocket-like character 36 providing recesses or spaces 37 therebetween, which are of uniform size. Similarly projecting from the periphery of the drum 29 are receptacles or forms 38 of a pocket-like character, providing recesses or spaces 39 between the same on the periphery of the drum 29. When the drum-like members 26 and 29 are arranged in the manner above referred to and driven by the intermeshing ring gears 34 and 35, the receptacles 36 on the drum 26 will pass into the recess 39 on the drum 29 and the receptacles 38 on the drum 29 will pass into the recesses 37 on the drum 26 where the same move into juxtaposition to each other, the peripheries of the drums thus intermeshing in a manner somewhat similar to that of a pair of gear wheels. It will be noted that the receptacles 38 project farther from the periphery of the drum 29 than the receptacles 36 project from the periphery of the drum 26, this being accomplished by recessing the periphery of the drum 26 to accommodate the receptacles 36 while the receptacles 38 are placed directly on the peripheral surface of the drum, the purpose of this being described below.

Means is provided for supplying the receptacles or forms 36 and 38 with the loose fluffy fibrous insulating material of a cottony character in such a manner that the same fills said receptacles in a loose fluffy condition without being compacted therein. This is highly desirable to obtain the desired insulating effect of the loose fluffy insulating material. A hopper 40 supplies said loose fluffy material to the receptacles 36 on the drum-like or wheel-like member 26 in such loose fluffy condition in a manner to be described below, and a hopper 41 similarly supplies said insulating material in loose fluffy condition to the receptacles 38.

The hoppers 40 and 41 supply said loose fluffy insulating material in a substantially uniform layer over the entire periphery of each of said drums as these pass the outlets 42 and 43 of said hoppers during the rotation thereof. Means is provided for removing the loose fluffy material from the spaces 37 and 39, said removing means being indicated generally by the numerals 44 and 45 and being of a similar character, the details of construction thereof being described below and comprising generally air blast means providing a stream of air under pressure traveling substantially parallel to the axis of rotation of the drum, with which the removing means cooperates, transversely of the periphery thereof from one side thereof toward the other side thereof, and suction means opposite said air blast creating means.

The corrugated ply 21' of said sheet material is fed between the intermeshing projecting receptacles 36 and 38 in the manner shown in Fig. 1 of the drawings, and the loose fluffy fibrous insulating material contained in the pan-like receptacles 36 is deposited on the uppermost side of the corrugated ply 21'. It will be noted upon reference to Fig. 1 that the corrugations of the ply 21' are relatively small as compared with the recesses or spaces between the receptacles in the peripheries of the drums or wheel-like members 26 and 29, and that the relatively deep recesses 39 in the periphery of the member 29 receive said corrugated ply 21' so as to form a transverse trough, such as indicated at 46 in Fig. 2, for said ply 21' in each of said recesses 39, said trough-like portion 46 receiving the loose fill insulating material 47 from the receptacle 36 on the periphery of the member 26 that meshes with the recess 39 at the engaging portions of said rotatable members 26 and 29. Thus the parcel of loose fill insulating material 47 formed within the receptacle 36 is gently deposited by gravity in a trough-like pocket provided therefor in the upper surface of the corrugated ply 21'.

The transfer of the parcels of insulating material in the succeeding receptacles 26 is thus transferred to the pocket-like formations 46 facing upwardly in said corrugated ply 21'. Similar reversely arranged pocket-like formations or troughs having their open sides toward the periphery of the drum-like member 29 are formed by the projections 38 on the periphery of the drum-like member 29 overlying the same. After the loose fluffy insulating material 47 has been thus placed on the ply 21' the corrugated ply 21' passes along the downwardly traveling side of the drum-like member 29, and in order to prevent any loss of material 47 from the pockets thus provided in the ply 21' a cover ply is applied thereto before the pocket-like or trough-like formations reach such a point along the periphery of the drum-like member 29 that the loose insulating material 47 therein might spill therefrom.

The cover ply that is at this stage of the manufacture of the blanket applied to the corrugated and undulating central ply 21' is supplied from a roll 48 of said material, which is mounted rotatably on the framework to rotate about a fixed axis, the fibrous sheet material utilized, preferably, being kraft paper, the web thereof being indicated by the numeral 49 as extending from the roll 48 to and between a pair of rollers 50 and 51, said rollers being crimping rollers of a character that provide substantially parallel equally spaced scores, breaks or creases therein that extend transversely of the length of the web and provide bending lines in said web of kraft paper or similar material, reducing the stiffness thereof and making the finished blanket much more flexible, as will be described more in detail below. The so scored or creased ply is indicated by the numeral 49' in the drawings and extends over suitable guide rollers to means for applying various coatings thereto and then over suitable guide rollers to a guide roller 52, which is located in close adjacency to the periphery of the drum 29 in the position shown in Figs. 1 and 2 and in superposed relation to the ply 21' and the loose insulating material 47 around the lower portion of said drum into contact with a guideway in the form of a plate-like member 53. The means for moving the ply 49' exerts sufficient pull on the said ply to keep the same substantially taut so that there will be no noticeable undulations therein due to the breaking or creasing thereof accomplished by the rollers 50 and 51 between the discharge side of said rollers and the point of securement of the ply 49' to the ply 21 in a manner to be described below. Thus while the ply 49' will be substantially straight in the finished blanket, it will be free to bend around the scores or transverse breaks provided in the material thereof by the rollers 50 and 51.

The tank 54 contains a wax coating that is kept in a melted condition by means of a suitable heating coil provided therein, which is supplied with a heating liquid, such as hot oil, through an inlet pipe 55 and from which the oil that has been used for heating purposes discharges into an outlet pipe 56. The same heating medium is used for supplying heat sufficient to maintain the asphalt coating material in the tanks 57 and 58 in melted condition, the inlet pipe 55 having branches extending to the heating coils in the tanks 57 and 58 and being supplied with heated oil from a supply pipe 59 leading from any suitable oil heating device that may be provided. Similarly branches extend from the heating coils 57 and 58 to the outlet pipe 56, which is connected with a return pipe 62 to the oil heating means.

The web 49' creased or scored as above described passes over suitable guide rollers so as to engage the upper surface of a waxing roller 61, which extends into the body of melted wax in the tank 54, the waxing roller 61 being positively driven at a speed such that the periphery thereof moves somewhat slower than the web of sheet material 49' as it is being pulled along by the drum 29 so that said web 49' engages said roller 61 with a wiping action, so as to apply a thin coating of wax to the under face of the web 49'. After the web 49' leaves the roller 61 it engages with a scraper member 62, which is adjustable vertically and angularly in a manner to be described below, so as to exert a desired scraping action on the wax coated face of the web 49' to remove any excess wax therefrom. Said web 49' then passes over a plurality of guide rollers mounted on the frame as shown in Fig. 1 of the drawings, to turn the same over so that the opposite face thereof to which the wax coating has been applied engages the roller 63, which is mounted to rotate in the melted asphalt in the tank 57, which roller also rotates at a speed so that its periphery is moving somewhat slower than the web so that said web 49 will exert a wiping action on said roller to apply a thin coating of the asphalt to said web on the opposite face thereof to which the wax has been supplied.

The rollers 61 and 63 rotate in a direction indicated by the arrows, the web traveling in the direction indicated by the arrow in Fig. 1. After said web 49' leaves the roller 63 it engages a scraper member 64, similar to the scraper member 62, and similarly adjustable to remove the excess asphalt coating therefrom. Said web then passes over suitable guide rollers to engage the same with the top surface of a plurality of striping rollers, which are indicated generally by the numeral 65 in Fig. 1, and which apply a plurality of spaced stripes of asphaltic material thereon, said striping rollers extending into a body of asphaltic material in the tank 58.

The guide rollers between said striping roller 65 and the roller 52 turn said web 49' so that the asphalt striped and asphalt coated face of said web 49' is toward the periphery of the wheel-like or drum-like member 29 as it passes from the guide roller into engagement with the corrugated ply 21' having the parcels of insulating fibrous material 47 thereon, and said roller 52 in cooperation with the rim portions of the projecting receptacles 38 press the adjacent faces of the plies 49' and 21' into engagement, causing said plies to be adhesively secured together between the parcels of insulating material 47 that have been placed thereon, said plies 49' and 21' thus moving together with the periphery of the drum 29 into engagement with the guide plate or guideway 53.

As the partly finished blanket comprising the plies 21' and 49' and the particles of loose fluffy fibrous insulating material 47 pass from the lower portion of the drum-like member 29 to the guide member 53, which comprises an inclined plane extending upwardly from a point substantially tangent with the periphery of the wheel or drum-like member 29 slightly to one side of the lowermost point of said periphery. The parcels 47' of insulating material in the receptacles 38 are deposited by gravity into the trough-like formations in the web 21', the same being deposited gently by gravity from said receptacle in the manner shown in Fig. 2 of the drawings.

In order to direct the loose fluffy insulating material 47' into the trough-like pockets thus formed between the pockets in which the insulating material 47 has been placed, means is provided for holding said loose fluffy fibrous insulating material 47' in the trough-like pockets provided therefor in said web 21' and preventing escape of any thereof from the blanket comprising a belt 66, which has the lower run thereof traveling in the same direction as the insulating blanket and at the same speed as the peripheral speed of the drums 26 and 29, said belt gradually approaching said insulating blanket to level off and confine the loose fluffy insulating material 47' in the pockets provided therefor but being spaced sufficiently from the inclined guide plate 53 to provide only a slight compressing action on the loose fibrous material 47 or 47'.

Said belt 66 operates over the rollers 67 and 68, which are similar to conveyor belt rollers, the said belt thus being in the nature of a conveyor belt in action and construction, except that it is operating on the top side of the insulating blanket instead of supporting the same, as is customary with conveyor rollers. The roller 68 is driven in the direction indicated by the arrow in Fig. 1, said roller being driven in any suitable manner in timed relation to the rate of rotation of the drum 29. In the form of the invention shown the roller 68 is fixed on the shaft 69 on which a sprocket 70 is also fixed, over which a sprocket chain 71 operates, which operates over the sprocket wheel 72 fixed to the shaft 30.

After the insulating blanket with the parcels of loose fluffy fibrous insulating material arranged in overlapping relation as shown in Fig. 2, with one set thereof confined between the plies 49' and 21' and the other resting in the trough-like recesses on the upper side of the corrugated ply 21', leaves the belt 66 as it passes around the roller 68 said blanket travels up the inclined guide plate 53 toward a large roller 73, which applies the other covering ply to said blanket to close the trough-like pockets provided in the unfinished blanket for the parcels of insulating material 47'.

The last mentioned outer ply of fibrous sheet material, such as kraft paper, is supplied from a roll 74 thereof rotatably mounted on the framework of the machine. The web 75 of said fibrous sheet material passes between a pair of crimping rollers 50' and 51' that are duplicates of the rollers 50 and 51 and similarly provide transverse scorings, breaks or creases in the web 75 to provide such a creased web 75', which passes over the waxing roller 76 rotating in the direction indicated by the arrow in Fig. 1 and rotating at a slightly slower speed than the rate of travel of the web 75', said web traveling in the direction of the arrow in Fig. 1 to obtain a wiping action of said web on the surface of the roller 76 in the same manner as previously described, said roller 76 extending into liquefied wax in the tank 77, which is heated by means of a heating coil similar to that in which the tank 54 is heated, the oil being supplied through the inlet pipe 55' and returned by means of the outlet pipe 56', said pipes also having branches extending therefrom for circulating oil in heating coils in the tanks 78 and 79 in a manner similar to that described in connection with the tanks 57 and 58. The hot oil supply line 59' leads to the inlet pipe 55' from the same heating means as the supply pipe 59 and the return pipe 60' leads back to said heating means from the outlet pipe 56' in the same manner as the return line 60 leads from the outlet pipe 56 to said heating means.

The web 75' is guided by means of suitable guide rollers to engage with an adjustable scraper member 80 for removing excess wax in the same manner as the scraper member 62, previously described, and then into wiping engagement with the asphalt applying roller 81 mounted in the tank 79, which operates in the same manner as the roller 63 so that said web 75' has a wiping engagement therewith, said rollers 76 and 81 rotating in the direction indicated by the arrows in Fig. 1. Said web 75' is further guided by suitable guide rollers on the frame to engage the adjustable scraper member 82, similar to and serving the same function as the scraper member 64 previously described, and to subsequently engage the striping rollers 83, which are similar in character to the striping rollers 65. From said striping rollers 83 the web 75' passes to the roller 73 over suitable guide rollers on the frame so that the wax coating face of the web 75' will be outward when passing over the roller 73, said roller 73 being suitably spaced from the inclined guide plate 53 that the asphalt coated face of said web 75' will engage the exposed portions of the web 21' between the parcel of insulating material 47' to thus cause said plies 75' and 21' to be adhesively secured to each other.

Figures 7, 8, 9, 10, 11, 12:
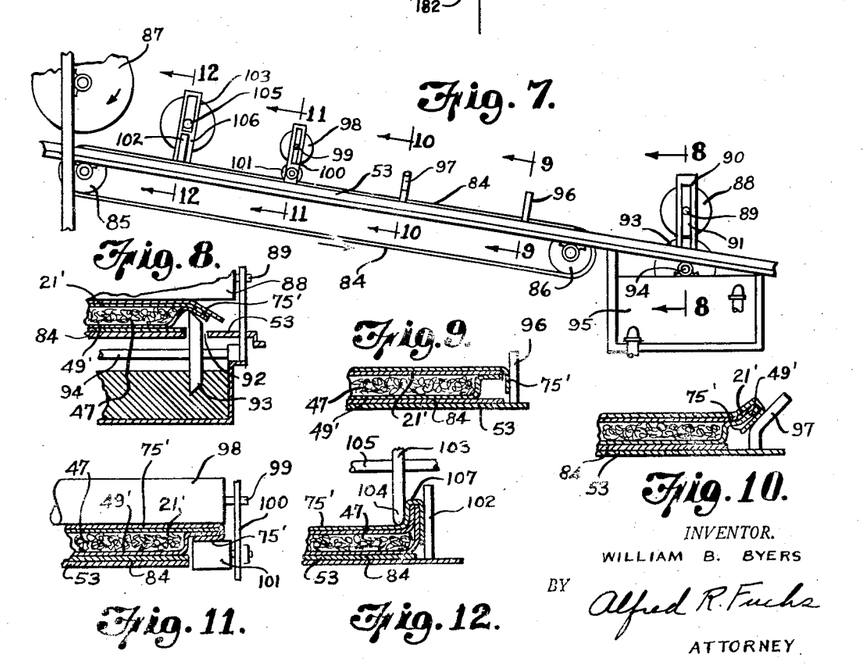
Fig. 7 is a side elevational view of the folding mechanism.
Fig. 8 is a fragmentary sectional view thereof taken on the line 8—8 of Fig. 7, showing an insulating blanket passing therethrough.
Fig. 9 is a similar view taken on the line 9—9 of Fig. 7.
Fig. 10 is a similar view taken on the line 10—10 of Fig. 7.
Fig. 11 is a view taken on the line 11—11 of Fig. 7.
Fig. 12 is a similar view taken on the line 12—12 of Fig. 7.

The insulating blanket comprising the plies 49', 21' and 75' and the parcels of loose fluffy insulating material 47 and 47' in oppositely facing pockets formed by the undulating middle ply 21' and the outer plies 75' and 49' is carried along the guide plate 53 after passing between the same and the roller 73 into engagement with striping and longitudinal creasing mechanism and folding mechanism, said folding mechanism comprising a conveyor belt 84, which passes through suitable slots in the plate-like guide member 53 so as to overlie said plate 53 as shown in Fig. 7, the same being driven at approximately the speed of the travel of the webs through the various mechanisms of the machine, but so as to exert sufficient pull thereon to maintain the blanket in a taut condition, the belt operating over a driven roller 85 and an idler roller 86, the roller 87 being also positively driven to rotate at the same peripheral speed as the speed of the belt 84 and exerting sufficient pressure on the blanket to aid in pulling the same through the machine, said blanket passing to a suitable reel upon which the same is wound after passing under the roller 87. The roller 87 rotates in the direction indicated by the arrow in Fig. 7, and the belt 84 travels in the direction indicated by the arrow in said figure.

The striping and creasing mechanism comprises a roller 88, which has a shaft 89 projecting endwise therefrom mounted in brackets 90 having vertical slots 91 therein permitting vertical movement of the roller 88 (see Figs. 1, 7 and 8), whereby said roller will be free to rest on the insulating blanket as it passes between the same and the guide plate 53. The plate-like member 53 is provided with slots 92 therein through which the bevel edged striping and creasing wheels 93 extend, there being, of course, a pair of said wheels, one at each side of the machine, mounted on a shaft 94 so as to be freely rotatable by engagement of the insulating blanket therewith, said wheels 93 creasing the blanket as shown in Fig. 8 lengthwise thereof to provide a fold line and at the same time applying a narrow stripe of asphaltic material thereto, which acts as an adhesive to secure the folded margins of the blanket together in a manner to be described below, the asphaltic material being contained in a tank 95, which is heated in a similar manner to the tanks previously described to maintain the said asphaltic material in a molten condition.

The blanket with the crease provided therein and the stripe of asphaltic material applied thereto passes onto the conveyor belt 84 and is carried by said conveyor belt first into engagement with an upstanding pin or post 96 at each side thereof to turn down the marginal portion of the ply 75', which is wider than the other plies, into the position shown in Fig. 9, and then in contact with an obliquely extending pin or post 97 to turn the flaps on the ply 75' under the projecting flap portions of the plies 21' and 49', as shown in Fig. 10. Next the conveyor belt carries the blanket under a roller 98, which has shaft portions 99 mounted in slots in the brackets 100 so as to permit the roller 98 to bear on the upper ply 75' of the blanket, being free to move up and down in the slotted bracket 100. Cooperating with the roller 98 is a roller 101 on each side of the conveyor belt 84, which completes the turning down of the flap on the ply 75' and presses the extending flap portions of the plies 75', 49' and 21' together so as to firmly adhesively secure the same together, there having been a pair of stripes of tacky asphaltic coating material provided along each of the marginal portions of the webs 75' and 49' by the striping means to provide means for securing said flaps together.

After the flaps have been thus fixed to each other the same are turned perpendicularly to the body portion of the blanket by means of the pins or post-like members 102 and the disk-like wheels 103 provided on each side of the machine, said disk-like members 103 having somewhat rounded peripheries 104 and being mounted on a shaft 105, which is mounted in suitable bearing brackets 106, and in order to roll up the blanket in a compact form the flaps 107 that are formed by the mechanism shown in Figs. 7 and 12 are turned down against the ply 75' by passing between the roller 87 and the guide plate 53 before being rolled up.

Figures 3, 4, 5, 13, 14:
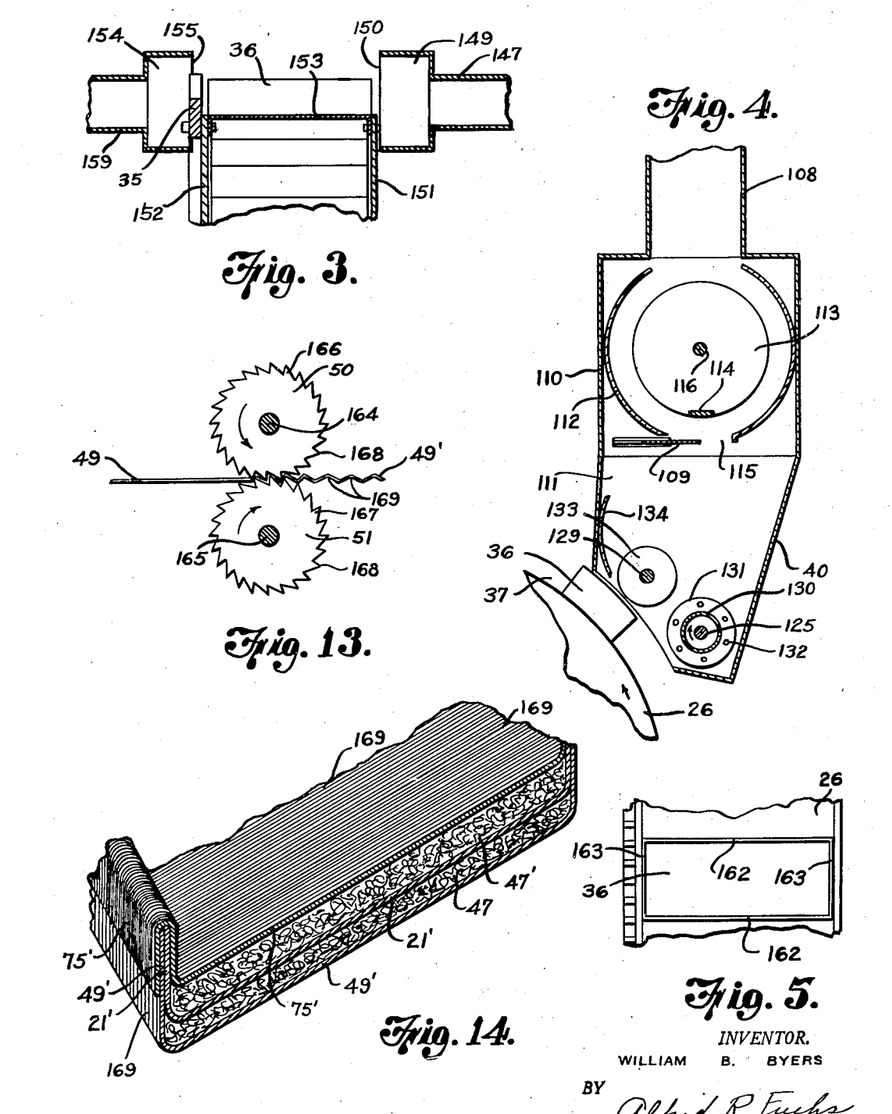
Fig. 3 is a fragmentary sectional view taken on the line 3—3 of Fig. 2.
Fig. 4 is a fragmentary vertical sectional view through one of the feeding hoppers.
Fig. 5 is a fragmentary elevational view of the peripheral portion of one of the rotary wheel-like or drum-like members.
Fig. 13 is an enlarged side elevational view of a pair of scoring or creasing rollers.
Fig. 14 is a fragmentary perspective view partly in section of the completed insulating blanket made by my machine.

Referring now to Fig. 4 it will be noted that the hopper 40, (the hoppers 40 and 41 being substantial duplicates), has a supply conduit 108 leading into the upper portion thereof, a duplicate supply conduit 108 leading into the upper end of the hopper 41. Said body portion is provided with partitioning means 109 to divide the same into an upper chamber 110 and a lower chamber 111. The upper chamber has a curved wall portion 112 therein providing means for directing the loose fluffy insulating material from the inlet conduit 108 into the path of a rotatable disk-like member 113 having a projecting vane 114 thereon, which, upon reaching the position opposite the opening 115, will project a measured quantity of said loose fluffy material through said hopper into the chamber 111, thus serving as a measuring means for the loose fluffy material, as well as maintaining the same agitated to prevent any packing of the same in the hopper 40.

The disk-like member 113 is fixed on the shaft 116, which is positively driven at a predetermined speed by means of a pulley mounted thereon driven by the belt 117, a belt 117' operating over the pulley 118 on the shaft 116, operating a similar mechanism in the hopper 41 and both belts being driven by pulleys mounted on the shaft 119 projecting from a gear box 120. Also projecting from said gear box is a shaft 121, which has a sprocket 122 fixed thereto, over which the sprocket chain 123 operates, that also operates over a sprocket wheel 124 fixed on the shaft 125, which also has fixed thereto a sprocket wheel 126 over which a sprocket chain 127 operates, that also drives the sprocket wheel 128 fixed on a shaft 129.

Mounted on the shaft 125 and rotating therewith is a rotatable agitating and distributing member having a cylindrical body portion 130 and side flanges 131, between which rod-like members 132 extend, said agitating member rotating in the direction indicated by the arrow in Fig. 4 and the rotating drum-like member 26 rotating in the direction indicated by the arrow in Fig. 4, the rotating, distributing and agitating member will cause a layer of said loose fluffy insulating material to be deposited on the periphery of the member 26 to a depth slightly greater than the projection of the receptacles 36 from the periphery of the rotatable member 26.

An excess of said loose fluffy insulating material will thus be deposited on the periphery of the member 26 and in a similar manner on the periphery of the member 29 from the hoppers 40 and 41. There is, of course, an agitating and distributing member similar to that above described in the hopper 41 in a similar location to that of these parts in the hopper 40. Each of the hoppers is also provided with a rotary brush-like member 133, which rotates in the same direction as the rotary distributing member above described, and removes the excess depth of loose fluffy insulating material, throwing the same back up into the chamber 111 above the brush 133 so as to be added to the supply that is being carried down to the agitating and distributing means in the bottom part of the hopper. Each of said hoppers is also provided with a curved wall portion 134, which cooperates with the brush 133 to smooth off the layer of loose fluffy insulating material on the rotary members 26 and 29, the brush 133 in the hopper 40 being mounted to rotate with the shaft 129. The combined action of said rotary distributing member and said brush leaves a layer of said loose fluffy insulating material that is of uniform depth and substantially of a depth equal to the projection of the members 36 and 38 on the wheel-like members 36 and 29 projecting a very slight amount beyond the rim of said receptacles.

The shafts 125' and 129' in the hopper 41 correspond to the shafts 125 and 129 in the hopper 40. Said shafts are driven from a sprocket 136 fixed on the shaft 137 extending from the gear box 120 through the sprocket chain 137, the sprocket wheels 138 and 139, and the sprocket chain 140. The input shaft of the gear box is driven by means of a sprocket chain 141, which operates over a suitable sprocket wheel 142 on said input shaft and a sprocket wheel 143 driven by the motor 144.

A blower 145 is provided driven by a motor 146, from which the conduits 147 and 148 lead to the air blast means comprising a portion of the removal means for the loose fluffy insulating material in the recesses 37 and 39 on the peripheries of the drums 26 and 29. The said devices 44 and 45 for removing said loose fluffy insulating material from said spaces or recesses are duplicates and each is provided with an air blast outlet box connected with one of said branches 147 and 148, the outlet box 149 being shown in Fig. 3, which is connected with the branch conduit 147 and has an open side 150 to direct the air blast transversely across the periphery of the drum 26, which is shown as having side walls 151 and 152 and a peripheral wall 153, the receptacle 36 being shown as being out of alignment with said air blast outlet chamber 149.

Cooperating with each of said air blast outlet chambers is a suction chamber 154, which has an open side 155 directed toward the spaces between the receptacles 36 so that there will be a strong blast of air from the chamber 149 to the suction chamber 154 transversely of the periphery of each of the wheel-like or drum-like members. The suction chambers 154 are connected with the intake side of the blower-like suction creating device 155, which is driven by means of the motor 156 through suitable driving means 157, an intake conduit 158 extending into said suction creating member and having the branches 159 and 160 connected with the two suction chambers 154 provided in each of the devices 44 and 45. The loose fluffy insulating material thus removed from the periphery of the drum-like members is discharged from the blower 155 into a return conduit 161, which returns the same to the source of supply from which the supply conduits 108 extend.

It will be noted upon reference to Fig. 5 that each of the receptacles 36, the receptacles 38 being exact duplicates thereof except that the same project farther from the periphery of the wheel-like or drum-like member 29 than do the members 36 from the wheel or drum-like member 26, are of a rectangular pan-like character and are provided with a pair of longitudinally extending walls 162 that extend transversely of the periphery of the member 26 and with end walls 163 that extend substantially along the side edges of the periphery of said drum-like member 26. The walls 163 of said members 36 and corresponding walls of the members 38 act as baffle means to prevent blowing of the loose fluffy insulating material out of the molds or pocket-like receptacles 36 and 38. Thus after the devices 44 and 45 are passed the receptacles 36 and 38 will be substantially level full of the loose fluffy insulating material and will form parcels of loose insulating material, which will be elongated transversely of the blanket when deposited thereon.

The pair of rollers 50 and 51, of which the rollers 50' and 51' are duplicates, are shown in detail in Fig. 13, said rollers rotating in the direction indicated by the arrows thereon, being mounted on shafts 164 and 165 so as to be freely rotatable by engagement of the web 49 therewith as it is pulled through between the same. Said rollers are provided with ribs 166 and 167 thereon that are of the cross sectional shape of ratchet teeth having rather sharp edges 168 on their outer extremities and being oppositely directed so as to interfit as shown in Fig. 13 to crease or break the web of fibrous sheet material 49 to form the parallel creases, bending lines or scorings 169 therein, which extend in uniformly spaced relation transversely across said plies, being provided both in the plies 49' and 75', as will be obvious from Fig. 14. Thus both cover plies of the blanket will be readily bendable along said lines to thus provide a more flexible blanket, which is more readily rolled up on itself to form rolls thereof for transporting purposes than if such breaks or bending lines 169 were not provided.

Figure 6:
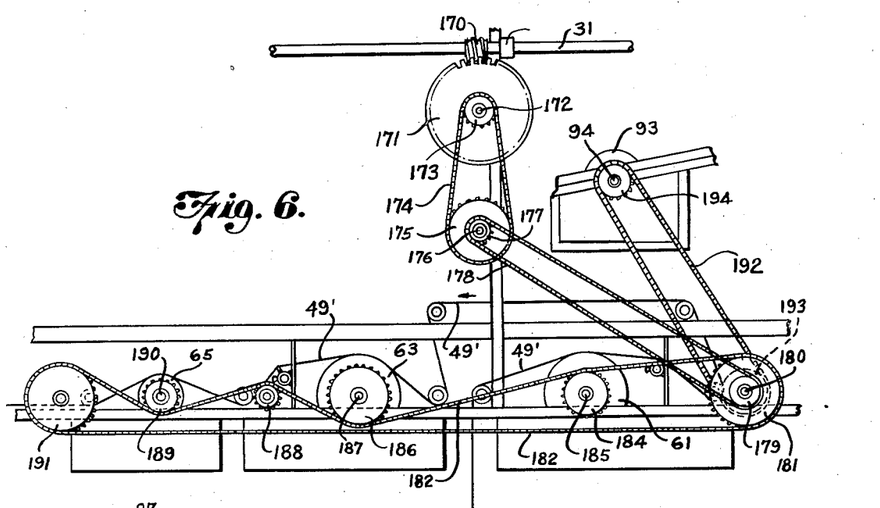
Fig. 6 is a fragmentary elevational view of one of the sets of coating devices and the driving means therefor.

A driving means for the various striping and other coating applying rollers is shown in Fig. 6, the driving means being that illustrated for the rollers 61, 63 and 65, the rollers 81, 83 and 76 being similarly driven. All of said striping and other coating rollers are driven from the shaft 31 in a similar manner to that illustrated for the rollers 61, 63 and 65. A worm 170 is provided on the shaft 31 that meshes with the worm wheel 171 that drives the shaft 172, upon which a sprocket 173 is mounted and over which a sprocket chain 174 operates, said sprocket chain operating over a sprocket wheel 175 fixed on the shaft 176, which also has a sprocket wheel 177 fixed thereon, over which a sprocket chain 178 operates, that also operates over the sprocket wheel 179 on the shaft 180.

The shaft 180 has a sprocket wheel 181 mounted thereon to rotate therewith, over which the sprocket chain 182 operates. The sprocket chain 182 engages a sprocket wheel 184 fixed on a shaft 185, on which the wax applying roller 161 is mounted to rotate therewith. Said chain 182 also engages a sprocket 186 on the opposite side thereof to rotate the asphalt applying roller 63 in the opposite direction to that in which the roller 61 rotates, the roller 63 being fixed on the shaft 187 on which said sprocket 195 is also fixed. An idler sprocket 188 is provided for the chain 182 between the sprocket 189 mounted on the shaft 190 to rotate the striping rollers 65 in the same direction as the roller 63 and said chain 182 also operates over an idler sprocket 191. Thus all of the rollers are rotated in the desired direction at a predetermined rate relative to the rate of travel of the web 49 by the driving means above described.

Similarly the striping rollers 93 are driven from the shaft 180 by means of a sprocket chain 192, which operates over a sprocket 193 fixed on the shaft 180 and a sprocket 194 fixed on the shaft 94 on which said striping rollers 93 are fixed.

In operation the webs 21, 49 and 75 of fibrous sheet material, such as kraft paper, are supplied from the rolls 20, 48 and 74 in the manner above described, the web 21 passing between the corrugating rollers 24 and 25 to become the corrugated ply 21', and between the wheel-like members 26 and 29 to assume an undulating form in the recesses 39 and over the receptacles 38 on the wheel-like member 29, parcels of the loose fluffy fibrous insulating material deposited in the receptacles 36, being deposited on said corrugated ply 21' as it passes between the wheel-like members 26 and 29.

After this has been accomplished the ply 49', which has resulted from passing the ply 49 through the crimping rollers 50 and 51 engages with the ply 21'. Said ply 49' has previously been coated with wax on what is the side thereof remote from the ply 21' by means of the roller 61, the wax having a melting point of about 150 degrees Fahrenheit and has subsequently been coated on the face thereof toward the web 21' with asphaltic material by means of the roller 63, said asphaltic material having a melting point of about 120 degrees Fahrenheit, and has also been coated on the same side as with the asphaltic material above referred to with a plurality of parallel stripes, two near each side edge thereof and two in the intermediate portion thereof, of asphaltic material having a melting point of about 160 degrees Fahrenheit, which asphaltic material has the quality of being in a tacky condition throughout the time that the web is passing through the machine, thus causing the adherence of the webs 21' and 49' where the same contact at the points where the web 21' passes over the projecting receptacles 38. The webs 49' and 21' are then carried along by means of the rotatable member 29 and the belt 66 and the parcels of loose fluffy insulating material are deposited in the trough-like formations on the upper side of the partly finished blanket as it leaves the wheel-like member 29.

The ply 75, which has been passed through the rollers 50' and 51' to form the creased ply 75' and has been similarly coated with wax and asphaltic material and stripes of asphaltic material of the melting points aforementioned by the rollers 76, 81 and 83 is engaged with the ply 21' by means of the roller 73 at the exposed portions of said ply, after which the stripes and creases are applied by means of the wheels 93, after which the folding mechanism folds and secures the marginal portions of the plies 49', 21' and 75' together by the successive operations illustrated in Figs. 9, 10, 11 and 12.

What I claim is:

1. In a machine for making insulating blankets, a pair of adjacent rotatable members having spaced pockets provided at the periphery thereof, means for depositing fibrous insulating material in a loose fluffy condition into said pockets, means for feeding a continuous web of sheet material between said rotatable members in juxtaposition to said pockets and around portions of the peripheries of said rotatable members to deposit parcels of said loose fluffy material from said pockets on opposite sides of said web by gravity, means for engaging a web of sheet material with said first mentioned web on each side thereof, and means for securing said webs together to maintain said parcels in the positions in which the same were deposited.

2. In a machine for making insulating blankets, a pair of adjacent rotatable members having spaced pockets provided at the periphery thereof, means for depositing fibrous insulating material in a loose fluffy condition into said pockets, means for feeding a continuous web of sheet material between said rotatable members in juxtaposition to said pockets and around portions of the peripheries of said rotatable members to deposit parcels of said loose fluffy material from said pockets on opposite sides of said web by gravity, means for corrugating said web of sheet material prior to entering between said rotatable members, means for engaging a web of sheet material with said first mentioned web on each side thereof, and means for securing said webs together to maintain said parcels in the positions in which the same were deposited.

3. In a machine for making insulating blankets, a pair of adjacent rotatable members having spaced pockets provided at the periphery thereof, means for depositing fibrous insulating material in a loose fluffy condition into said pockets, means for rotating said members at the same peripheral speed, means for feeding a continuous web of sheet material between said rotatable members in juxtaposition to said pockets and around portions of the peripheries of said rotatable members to deposit parcels of said loose fluffy material from said pockets on opposite sides of said web by gravity, means for corrugating said web of sheet material prior to entering between said rotatable members, said corrugating means being driven in timed relation to the rate of rotation of said members to measure said web fed to said rotatable members, means for engaging a web of sheet material with said first mentioned web on each side thereof, and means for securing said webs together to maintain said parcels in the positions in which the same were deposited.

4. In a machine for making insulating blankets, a pair of adjacent rotatable members having spaced pockets provided at the periphery thereof, means for depositing fibrous insulating material in a loose fluffy condition into said pockets, comprising feed hoppers having discharge outlets open to the periphery of said hopper to deposit a layer of said loose fibrous insulating material on the periphery of each of said rotatable members, means externally of said hoppers for removing said layer of insulating material from the spaces between said pockets, means for feeding a continuous web of sheet material between said rotatable members in juxtaposition to said pockets and around portions of the peripheries of said rotatable members to deposit parcels of said loose fluffy material from said pockets on opposite sides of said web by gravity, means for engaging a web of sheet material with said first mentioned web on each side thereof, and means for securing said webs together to maintain said parcels in the positions in which the same were deposited.

5. In a machine for making insulating blankets, a pair of adjacent rotatable members having spaced pockets provided at the periphery thereof, means for depositing fibrous insulating material in a loose fluffy condition into said pockets, comprising feed hoppers having discharge outlets open to the periphery of said hopper to deposit a layer of said loose fibrous insulating material on the periphery of each of said rotatable members, agitating means in said hoppers, means externally of said hoppers for removing said layer of insulating material from the spaces between said pockets, means for feeding a continuous web of sheet material between said rotatable members in juxaposition to said pockets and around portions of the peripheries of said rotatable members to deposit parcels of said loose fluffy material from said pockets on opposite sides of said web by gravity, means for engaging a web of sheet material with said first mentioned web on each side thereof, and means for securing said webs together to maintain said parcels in the positions in which the same were deposited.

6. In a machine for making insulating blankets, a pair of adjacent rotatable members having spaced pockets provided at the periphery thereof, means for depositing fibrous insulating material in a loose fluffy condition into said pockets, comprising feed hoppers having discharge outlets open to the periphery of said hopper to deposit a layer of said loose fibrous insulating material on the periphery of each of said rotatable members, means externally of said hoppers for removing said layer of insulating material from the spaces between said pockets, comprising an air blast on one side of each of said rotatable members and suction means opposite thereto on the other side of each of said rotatable members, means for feeding a continuous web of sheet material between said rotatable members in juxtaposition to said pockets and around portions of the peripheries of said rotatable members to deposit parcels of said loose fluffy material from said pockets on opposite sides of said web by gravity, means for engaging a web of sheet material with said first mentioned web on each side thereof, and means for securing said webs together to maintain said parcels in the positions in which the same were deposited.

7. In a machine for making insulating blankets, an upper member rotatable about a substantially horizontal axis, a lower member rotatable about an axis parallel thereto, spaced pocket-like receptacles projecting from the peripheries of said upper and lower members to define recesses therebetween, said receptacles on said lower member projecting farther from the periphery thereof then said receptacles on said upper member project from its periphery to define deeper recesses in the periphery of said lower member than in said upper member, said upper and lower members being related so that the receptacles of each of said members enter the recesses of the other thereof upon rotation of said members, means for depositing fibrous insulating material in a loose fluffy condition in said receptacles, means for feeding a continuous web of sheet material between said rotatable members in juxtaposition to said receptacles and around portions of the peripheries of said rotatable members to deposit parcels of said loose fluffy material from said receptacles on opposite sides of said web by gravity, means for engaging a web of sheet material with said first mentioned web on each side thereof, and means for securing said webs together to maintain said parcels in the positions in which the same were deposited.

8. In a machine for making insulating blankets, an upper member rotatable about a substantially horizontal axis, a lower member rotatable about an axis parallel thereto, spaced pocket-like receptacles projecting from the peripheries of said upper and lower members to define recesses therebetween, said receptacles on said lower member projecting farther from the periphery thereof than said receptacles on said upper member project from its periphery to define deeper recesses in the periphery of said lower member than in said upper member, said upper and lower members being related so that the receptacles of each of said members enter the recesses of the other thereof upon rotation of said members, means for depositing fibrous insulating material in a loose fluffy condition in said receptacles, means for positively rotating said members at the same peripheral speed, means for feeding a continuous web of sheet material between said rotatable members in juxtaposition to said receptacles and around portions of the peripheries of said rotatable members to deposit parcels of said loose fluffy material from said receptacles on opposite sides of said web by gravity, means for engaging a web of sheet material with said first mentioned web on each side thereof, and means for securing said webs together to maintain said parcels in the positions in which the same were deposited.

9. In a machine for making insulating blankets, an upper member rotatable about a substantially horizontal axis, a lower member rotatable about an axis parallel thereto but out of vertical alignment therewith, spaced pocket-like receptacles projecting from the peripheries of said upper and lower members to define recesses therebetween, said receptacles on said lower member projecting farther from the periphery thereof than said receptacles on said upper member project from its periphery to define deeper recesses in the periphery of said lower member than in said upper member, said upper and lower members being related so that the receptacles of each of said members enter the recesses of the other thereof upon rotation of said members, means for depositing fibrous insulating material in a loose fluffy condition in said receptacles, means for feeding a continuous web of sheet material between said rotatable members in juxtaposition to said receptacles and around portions of the peripheries of said rotatable members to deposit parcels of said loose fluffy material from said receptacles on opposite sides of said web by gravity, means for engaging a web of sheet material with said first mentioned web on each side thereof, and means for securing said webs together to maintain said parcels in the positions in which the same were deposited.

10. In a machine for making insulating blankets, an upper member rotatable about a substantially horizontal axis, a lower member rotatable about an axis parallel thereto, spaced pocket-like receptacles projecting from the peripheries of said upper and lower members to define recesses therebetween, said receptacles on said lower member projecting farther from the periphery thereof than said receptacles on said upper member project from its periphery to define deeper recesses in the periphery of said lower member than in said upper member, said upper and lower members being related so that the receptacles of each of said members enter the recesses of the other thereof upon rotation of said members, means for depositing fibrous insulating material in a loose fluffy condition in said receptacles, means for feeding a continuous web of sheet material between said rotatable members in juxtaposition to said receptacles and around portions of the peripheries of said rotatable members to deposit parcels of said loose fluffy material from said receptacles on opposite sides of said web by gravity, means for corrugating said web of sheet material prior to entering between said rotatable members, said corrugating means being driven in timed relation to the rate of rotation of said members to measure said web fed to said rotatable members, means for engaging a web of sheet material with said first mentioned web on each side thereof, and means for securing said webs together to maintain said parcels in the positions in which the same were deposited.

11. In a machine for making insulating blankets, an upper member rotatable about a substantially horizontal axis, a lower member rotatable about an axis parallel thereto, spaced pocket-like receptacles projecting from the peripheries of said upper and lower members to define recesses therebetween, said receptacles on said lower member projecting farther from the periphery thereof than said receptacles on said upper member project from its periphery to define deeper recesses in the periphery of said lower member than in said upper member, said upper and lower members being related so that the receptacles of each of said members enter the recesses of the other thereof upon rotation of said members, means for depositing fibrous insulating material in a loose fluffy condition in said receptacles, comprising feed hoppers having discharge outlets open to the periphery of said hopper to deposit a layer of said loose fibrous insulating material on the periphery of each of said rotatable members, means externally of said hoppers for removing said layer of insulating material from the spaces between said receptacles, means for feeding a continuous web of sheet material between said rotatable members in juxtaposition to said receptacles and around portions of the peripheries of said rotatable members to deposit parcels of said loose fluffy material from said receptacles on opposite sides of said web by gravity, means for engaging a web of sheet material with said first mentioned web on each side thereof, and means for securing said webs together to maintain said parcels in the positions in which the same were deposited.

12. In a machine for making insulating blankets, a pair of adjacent rotatable members having spaced pockets provided at the periphery thereof, means for depositing fibrous insulating material in a loose fluffy condition into said pockets, means for feeding a continuous web of sheet material between said rotatable members in juxtaposition to said pockets and around portions of the peripheries of said rotatable members to deposit parcels of said loose fluffy material from said pockets on opposite sides of said web by gravity, means for impressing transverse parallel bending lines on webs of sheet material, means for engaging a web of said last mentioned sheet material with said first mentioned web on each side thereof, and means for securing said webs together to maintain said parcels in the positions in which the same were deposited.

13. In a machine for making insulating blankets, a pair of adjacent rotatable members having spaced pockets provided at the periphery thereof, means for depositing fibrous insulating material in a loose fluffy condition into said pockets, means for feeding a continuous web of sheet material between said rotatable members in juxtaposition to said pockets and around portions of the peripheries of said rotatable members to deposit parcels of said loose fluffy material from said pockets on opposite sides of said web by gravity, a pair of intermeshing sharp ridged rollers for impressing transverse parallel bending lines on webs of sheet material, means for engaging a web of said last mentioned sheet material with said first mentioned web on each side thereof, and means for securing said webs together to maintain said parcels in the positions in which the same were deposited.

14. In a machine for making insulating blankets, a pair of adjacent rotatable members having spaced pockets provided at the periphery thereof, means for depositing fibrous insulating material in a loose fluffy condition into said pockets, means for feeding a continuous web of sheet material between said rotatable members in juxtaposition to said pockets and around portions of the peripheries of said rotatable members to deposit parcels of said loose fluffy material from said pockets on opposite sides of said web by gravity, means for applying an adhesive coating to a plurality of webs of sheet material, means for impressing transverse parallel bending lines on said last mentioned webs of sheet material before applying said adhesive coating thereto, and means for engaging said coated webs with said first mentioned web after said parcels of loose fluffy material have been deposited thereon.

15. In a machine for making insulating blankets, a pair of adjacent rotatable members having spaced pockets provided at the periphery thereof, means for depositing fibrous insulating material in a loose fluffy condition into said pockets, means for feeding a continuous web of sheet material between said rotatable members in juxtaposition to said pockets and around portions of the peripheries of said rotatable members to deposit parcels of said loose fluffy material from said pockets on opposite sides of said web by gravity, means for applying a wax coating to one side of each of a plurality of webs of sheet material, means for applying an asphalt coating to the other side of each of said last mentioned webs, and means for engaging the asphalt coated sides of said last mentioned webs with said first mentioned web after said parcels of loose fluffy material have been deposited thereon.

16. In a machine for making insulating blankets, a pair of adjacent rotatable members having spaced pockets provided at the periphery thereof, means for depositing fibrous insulating material in a loose fluffy condition into said pockets, means for feeding a continuous web of sheet material between said rotatable members in juxtaposition to said pockets and around portions of the peripheries of said rotatable members to provide transverse trough-like recesses in the opposite sides of said web and deposit parcels of said loose fluffy material from said pockets on opposite sides of said web by gravity into said trough-like recess in said web, means for engaging a web of sheet material with the exposed side of said first mentioned web after passing between said rotatable members while said first mentioned web is in engagement with the periphery of one of said rotatable members to provide confining means for said parcels of loose fluffy material on one side of said first mentioned web, and movable means for confining the parcels to said trough-like recesses on the opposite side of said first mentioned web after passing from the periphery of said last mentioned rotatable member.

17. In a machine for making insulating blankets, a pair of adjacent rotatable members having spaced pockets provided at the periphery thereof, means for depositing fibrous insulating material in a loose fluffy condition into said pockets, means for feeding a continuous web of sheet material between said rotatable members in juxtaposition to said pockets and around portions of the peripheries of said rotatable members to provide transverse trough-like recesses in the opposite sides of said web and deposit parcels of said loose fluffy material from said pockets on opposite sides of said web by gravity into said trough-like recesses in said web, means for engaging a web of sheet material with the exposed side of said first mentioned web after passing between said rotatable members while said first mentioned web is in engagement with the periphery of one of said rotatable members to provide confining means for said parcels of loose fluffy material on one side of said first mentioned web, and a belt moving in the direction of said webs after passing from the periphery of said last mentioned rotatable member engaging the side of said first mentioned web opposite that with which said confining web has been engaged.

WILLIAM B. BYERS.

REFERENCES CITED

The following references are of record in the file of this patent:

UNITED STATES PATENTS

| Number | Name | Date |
|---|---|---|
| 1,958,819 | Grayson | May 15, 1934 |
| 2,020,639 | Grayson | Nov. 12, 1935 |
| 2,342,839 | Byers | Feb. 29, 1944 |